United States Patent [19]
Caire et al.

[11] Patent Number: 6,016,328
[45] Date of Patent: Jan. 18, 2000

[54] METHOD AND APPARATUS FOR THE SYNCHRONIZATION OF A SIGNAL RECEIVING STATION

[75] Inventors: Guiseppe Caire, Turin, Italy; Carlo Elia, Oegstgeest, Netherlands

[73] Assignee: Agence Spatiale Europeenne, Paris, France

[21] Appl. No.: 08/780,660

[22] Filed: Jan. 7, 1997

[30] Foreign Application Priority Data

Jan. 16, 1996 [FR] France .................................. 96 00414

[51] Int. Cl.[7] .......................... H04L 27/10; H04L 27/14; H03D 3/00; G08C 19/00
[52] U.S. Cl. .......................... 375/272; 375/334; 329/300; 340/825.58
[58] Field of Search ........................... 375/334, 272–276; 329/300, 302; 340/825.58

[56] References Cited

U.S. PATENT DOCUMENTS

| | | | |
|---|---|---|---|
| 5,293,114 | 3/1994 | McCormick et al. | 324/76.22 |
| 5,343,498 | 8/1994 | Toy et al. | 375/376 |
| 5,428,647 | 6/1995 | Rasky et al. | 375/366 |
| 5,675,612 | 10/1997 | Solve et al. | 375/326 |
| 5,740,205 | 4/1998 | Baum et al. | 375/344 |

OTHER PUBLICATIONS

Communications—Fusing Command, Control and Intelligence, Oct. 11–14, 1992, vol. 1–2–03, Oct. 11, 1992, Institute of Electrical and Electronics Engineers, pp. 603–607, Chan et al., "Comparison of Two FFT–Based Demodulation Schemes For M–Ary FSK", p. 603.

*Primary Examiner*—Stephen Chin
*Assistant Examiner*—Albert Park
*Attorney, Agent, or Firm*—Seidel Gonda Lavorgni & Monaco

[57] ABSTRACT

In an FSK modulated signal receiving station a synchronization sub-system is arranged to sample the received signal and to select one sample per symbol within a detection window having a finite length, said samples being selected at predeterined instants. This produces a number of versions of the sampled signal and these different versions of the signal are then processed in parallel to determine the signal timing and the signal frequency offset.

8 Claims, 2 Drawing Sheets

METHOD AND APPARATUS FOR THE SYNCHRONIZATION OF A SIGNAL RECEIVING STATION

CROSS-REFERENCE TO RELATED APPLICATIONS

Priority Application : France No. 9600414, filed Jan. 16, 1996

BACKGROUND OF THE INVENTION

This invention relates generally to signal packet communication networks and more especially to multi-user communication systems, e.g. TDMA/FDMA satellite communication systems, where each user is assigned a time slot and a frequency slot at which he is allowed to transmit.

In a multi-user TDMA/FDMA satellite communication system, for instance, where several users access the satellite channel and send through signal packets according to some slotted access scheme, a hub ground station at the receiving end receives the stream of signal packets from many users and it recovers the original user information messages by demodulating and detecting the packets. In order to perform demodulation and detection, the hub station needs to estimate the signal timing and the frequency offset for each received signal packet.

The conventional techniques for timing and frequency estimation are based on tracking loops performing a closed-loop estimation. However, when the number of users is larger than the number of frequency slots and when the traffic is bursty, i.e. when the time between two consecutive packets from the same user is long with respect to the duration of a packet, it is difficult, if not impossible, for the hub station to track the timing and frequency offsets for each user, from packet to packet. Then, the hub station must be able to estimate the timing and frequency offsets independently for each received packet by some open-loop processing. In order to accomplish this task, the hub station receiver must be equipped with a synchronization sub-system which implements a fast, real-time and reliable open-loop timing and frequency estimation process.

A first approach consists in performing the timing and frequency estimations separately for each signal packet. First, the signal is oversampled (the number of symbols Ns is greater than the number M of samples per symbol) over a window of L symbols. Thereafter, the whole packet is decimated by a factor M/Ns and the frequency offset is estimated on the resulting decimated signal.

This method has the following drawbacks:
(a) in order to achieve a timing estimation error variance sufficiently small, the oversampling factor Ns/M must be at least 4,
(b) the computational load for the timing estimation is of the order of $N^2_s \log Ns$,
(c) the processing can be applied with a reasonable complexity only for binary or quaternary FSK modulation ($M \leq 4$),
(d) the frequency estimation process has a threshold value of signal-to-noise ratio for which the estimation error variance approaches its ideal value, at roughly 10 dB of Eb/No in the absence of timing errors.

The invention aims at overcoming the drawbacks mentioned above.

BRIEF SUMMARY OF THE INVENTION

An object of the present invention is to provide a novel synchronization method for non-coherent orthogonal FSK modulated signals, which is capable of open-loop operation with a low signal-to-noise ratio operating point.

Another object of this invention is to provide a novel method for open-loop time recovery and frequency offset estimation of non-coherent M-FSK modulated signals, which is suitable for all-digital, VLSI or DSP implementation.

Yet another object of this invention is to provide an open-loop timing and frquency offset estimation method for non-coherent M-FSK modulated signals, which can be implemented with a low computational complexity that grows linearly with the number of samples per symbol.

Still another object of the invention is to provide a novel architecture suitable for VLSI implementation of a synchronization sub-system for a non-coherent M-FSK demodulator.

In accordance with this invention, instead of performing the timing and frequency estimation on the over-sampled signal, the signal samples are first decimated by decimating each sample with a different epoch thereby to produce several versions of the sampled signal. Then, these different versions of the sampled signal are processed in parallel.

The timing information is recovered by selecting the signal which has the largest spectral peak while the frequency offset information is recovered by estimating the position of the peak on the frequency axis. Thereafter, once both the timing and frequency offsets have been determined, the sampled signal which has been previously stored in a RAM buffer, can be decimated, frequency corrected and detected by a Fourier Transform-based detector (FFT-based detector).

The main advantages of the method according to the invention are summarized herebelow.

The estimation of timing and frequency offset can be performed jointly with a computational load which depends linearly on the number of samples per symbol.

Since the decimated signals are processed in parallel, independently of each other, the estimation method is suitable for a fast parallel and pipelined VLSI hardware implementation. This allows the realization of very high speed modems operating with high-dimensional M-FSK modulation (M>4).

The threshold shown by the frequency estimate in the absence of timing errors is below 4 dB of Eb/No. It follows that the estimation process is well suited also for coded signals which are supposed to work at a low signal-to-noise ratio.

Extensive evaluation of the process of the invention performed with both theoretical analysis based on the Cramer-Rao bound and with computer simulations have shown that the performances in terms of bit-error rate of a system using the invention are almost high even with short observation lengths.

The advantages of the invention make it suitable for TDMA systems based on orthogonal M-FSK modulation with non-coherent detection, with short and bursty transmission, large frequency offsets, low signal-to-noise ratio operating point (typical of coded systems) and high modulation order M.

Typical applications of this invention include for example: indoor wireless communication, mobile communication with large Doppler frequency shift (e.g. in the avionic channel), satellite communication with small and cheap terminals in the Ka band.

Moreover, the process of the invention removes automatically the ambiguity arising in the frequency estimation process when the frequency offset is larger than the frequency deviation 1/2T with a small power efficiency penalty (less than 0.5 dB). This can be particularly indicated for mobile communication with very large Doppler frequency shift.

DETAILED DESCRIPTION OF THE INVENTION

The invention relates to the demodulation of a continuous-phase FSK modulated signal currently generated by an orthogonal M-FSK modulator (known per se). Such a signal has frequencies that are spaced by 1/T, where T denotes the symbol period. The complex envelope of the modulated signal is given by $$x(t, \epsilon, \Delta f)$$

where t denotes the time, $\epsilon$ denotes a timing offset (between 0 and 1) and $\Delta f$ denotes a frequency offset.

The complex envelope of the received signal in case of additive white Gaussian noise, is given by:

$$y(t, \epsilon, \Delta f) = x(t, \epsilon, \Delta f) + z(t)$$

where z(t) denotes a complex white Gaussian process with power spectral density No on the demodulator bandwidth.

In any digital demodulator, the received signal is first sampled at a rate Ns/T and then processed in order to recover the information data. If both the timing and the frequency recovery are perfect (i.e. $\epsilon = \Delta f = 0$), it is sufficient to sample the signal with Ns=M. On the contrary, when the symbol timing and the frequency offsets are not zero, the demodulator needs to proceed to estimating both $\epsilon$ and $\Delta f$ from the received signal.

In the demodulator according to the invention it is the synchronization sub-system that is assigned the task of proceeding to the $\epsilon$ and $\Delta f$ estimation from a finite length observation of the discrete-time received signal.

Instead of applying a conventional prior art approach to the received signal, according to the invention the received signal is first modified and then an estimation of the parameters $\epsilon$ and $\Delta f$ is applied on the modified signal.

Because of the particular nature of orthogonally FSK modulated signals, the synchronization sub-system of the invention produces an interesting new signal by decimating the observed signal $Y_n(\epsilon, \Delta f)$ by a factor Ns>M, i.e. just one sample is taken per symbol at the instants $iN_s + n_o$, where $n_o$ denotes the sampling epoch ($0 \leq n_o \leq N_s - 1$). This operation produces a modified signal $\overline{Y}_f(n_o)$ that is a single tone in additive noise.

If we assume that $\Delta f$ does not exceed the frequency deviation of orthogonal FSK, i.e. $|\Delta f| < T/2$, the observed signal $y_n(\epsilon, \Delta f)$ can be filtered before decimation by a low-pass filter with a cut-off frequency M/2 $N_s$ without distorting the modulated signal. In this way, the resulting noise samples are white noise.

Figure 1:
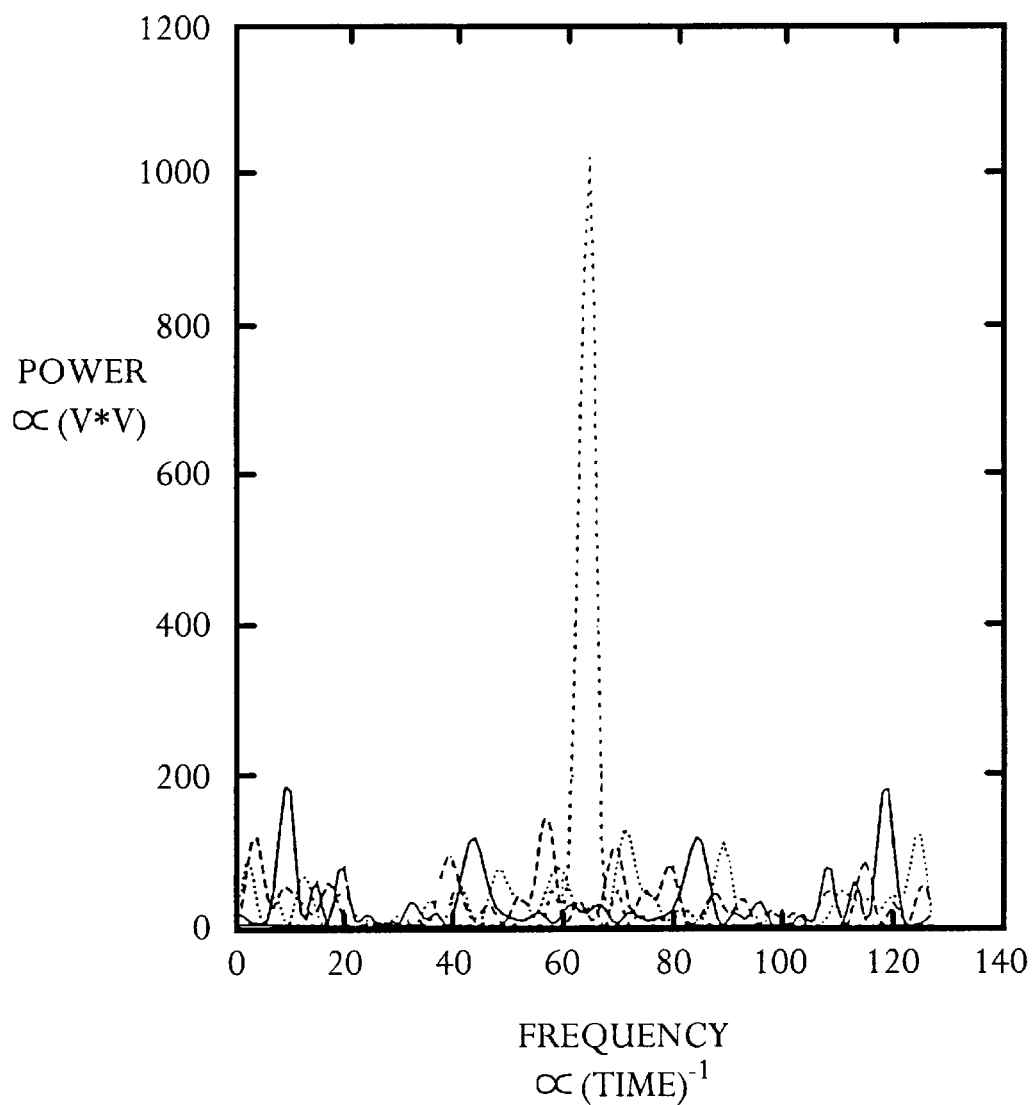
FIG. 1 is a diagram showing a typical frequency spectrum of a signal produced according to the invention for serving as a base for the estimation process.

If $n_o = \epsilon N_s$, the modified signal $\overline{Y}_f(n_o)$ is a pure complex tone. On the other hand, if $n_o \neq \epsilon N_s$, the pure complex tone contains more than one frequency component because the data sequence is not completely removed. As a result, for sufficiently high signal-to-noise ratio, the spectrum of $\overline{Y}_f(n_o)$ for $n_o \approx \epsilon N_s$ exhibits a large peak around the frequency $\Delta F N_s$, while the spectra of $\overline{Y}_f(n_o)$ for $n_o$ far from $\epsilon N_s$ have a flat shape as shown in FIG. 1.

The decimation operation is applied on the sample signal received through a detection window having a length of L symbols located in the middle of the received TDMA burst. The decimation process produces $N_s$ versions of the received (filtered) sampled signal. It is on these $N_s$ versions of the signal that, in accordance with this invention, the timing and frequency offset estimation is applied in parallel.

Figure 2:
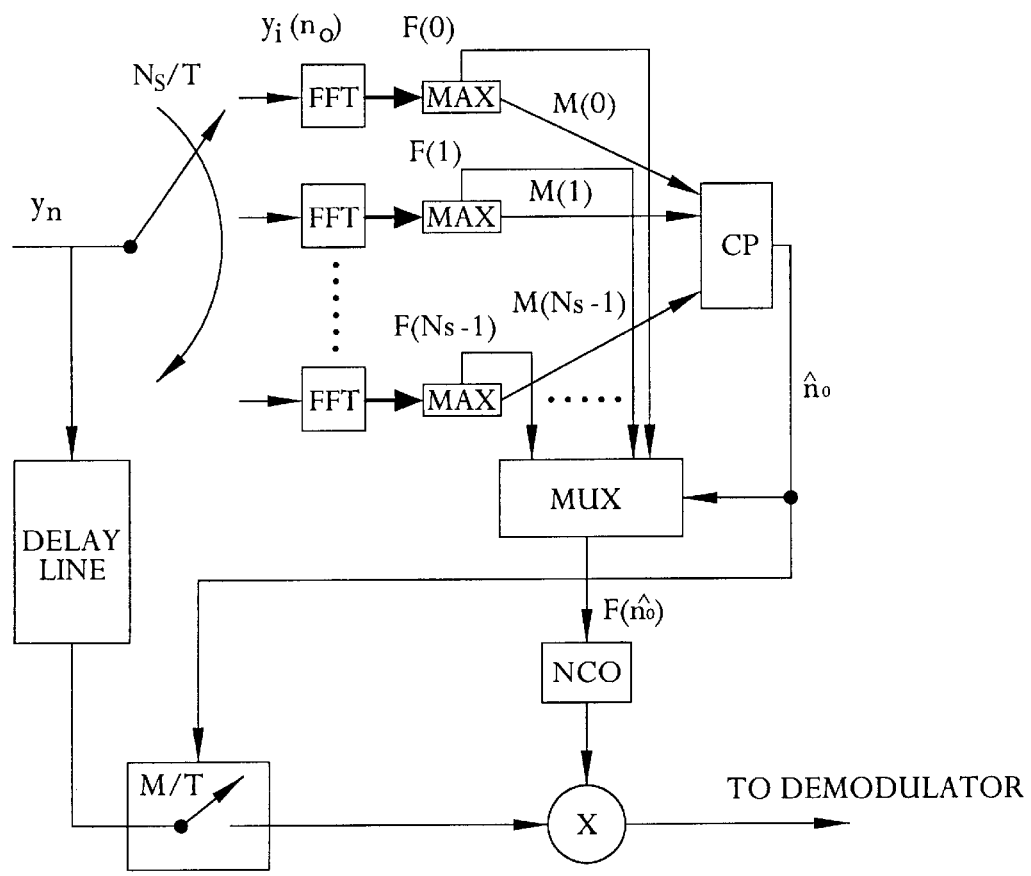
FIG. 2 is a block diagram of an embodiment of an exemplary structure implementing the estimation process of this invention.

The estimation process is set forth hereafter with reference to FIG. 2 which illustrates an exemplary synchronization structure suitable for implementing the process of the invention. Each decimated signal $\overline{Y}_f(n_o)$ is processed in an FFT processor to provide the square magnitude of its discrete-time Fourier transform $\overline{Y}(F, n_o)$ of length rL, where r is the FFT interpolation factor. A maximum computing cell MAX determines the maximum value of the square magnitude of signal $\overline{Y}(F, n_o)^2$ and provides two values:

$$M(n_o) = \max_F |\overline{Y}(F, n_o)|^2$$

$$F(n_o) = \arg\max_F |\overline{Y}(F, n_o)|^2$$

These two values serve to determine the estimated values of the parameters $\epsilon$ and $\Delta f$.

Comparator CP chooses $\hat{n}_o$ as the value $n_o$ corresponding to the largest value $M(n_o)$. The value $\hat{n}_o$ is given by:

$$\hat{n}_o = \arg\max_{n_o}\left\{\max_F |\overline{Y}(F, n_o)|^2\right\}$$

The MUX cell is arranged to select the value $F(\hat{n}_o)$ among the values $F(n_o)$ which are available, and computes the frequency offset estimation given by:

$$\Delta F = \frac{1}{N_s} F(\hat{n}_o)$$

The values $\hat{n}_o$ and $F(\hat{n}_o)$ are buffered in a buffer memory (not shown). The value $\hat{n}_o$ is used to compute the estimate of value $\epsilon$ by:

$$\epsilon = \hat{n}_o / N_s$$

On the other hand, the received signal $y_n(\epsilon, \Delta f)$ is applied to a delay line for instance, and then down-sampled at rate M/T to retain only M samples per symbol with the sampling epoch $\hat{n}_o$. The downsampled signal is then frequency corrected by multiplication with the complex tone $\exp(j2\pi nF(\hat{n}_o)/M)$, generated by a numerically controlled oscillator NCO before being coupled to a non-coherent demodulator (known per se) for non-coherent demodulation.

It is to be noted that while the current data block is being downsampled, frequency-corrected and demodulated, the estimation process can be applied on the next received block, so that the operations are pipelined and the demodulator can work at a very high speed.

We claim:

1. A method of synchronizing a frequency shift keying (FSK) modulated signal receiving station, comprising the steps of:

sampling the received M-FSK signal, selecting one sample per symbol within a detection window having a finite length, said samples being selected at predetermined instants $iN_s+n_o$, where $N_s$ is the number of symbols in the received signal and $n_o$ is the sampling epoch, thereby to produce a number $N_s$ of versions of the sampled signal, and processing in parallel said $N_s$ versions of the sampled signal to determine the signal timing and the signal frequency offset, wherein said data processing step comprises the step of selecting the sample having the largest spectral peak.

2. A method as set forth in claim 1, wherein said data processing step comprises the step of determining the position of the largest spectral peak in the frequency band.

3. A sub-system for synchronizing an FSK-modulated signal receiving station, comprising means for sampling the received M-FSK signal, means for selecting one sample per symbol within a detection window having a finite length, said samples being selected at predetermined instants $iN_s+n_o$, where $N_s$ is the number of symbols in the received signal and $n_o$ is the sampling epoch, thereby to produce a number $N_s$ of versions of the sampled signal, means for processing in parallel said $N_s$ versions of the sampled signal to determine the signal timing and the signal frequency offset, and means for selecting the sample having the largest spectral peak.

4. A synchronization sub-system as set forth in claim 3 comprising means for determining the position of the largest spectral peak in the frequency band.

5. A demodulator for demodulating FSK-modulated signals, comprising:

means for sampling the received M-FSK signal, means for selecting one sample per symbol within a detection window having a finite length, said samples being selected at predetermined instants $iN_s+n_o$, where $N_s$ is the number of symbols in the received signal and $n_o$ is the sampling epoch, thereby to produce a number $N_s$ of versions of the sampled signal, means for processing in parallel said $N_s$ versions of the sampled signal to determine the signal timing and the signal frequency offset, and means for selecting the sample having the largest spectral peak.

6. A demodulator as set forth in claim 5, comprising means for determining the position of the largest spectral peak in the frequency band.

7. An FSK-modulated signal receiving station, including a synchronization sub-system comprising:

means for sampling the received M-FSK signal, means for selecting one sample per symbol within a detection window having a finite length, said samples being selected at predetermined instants $iN_s+n_o$, where $N_s$ is the number of symbols in the received signal and $n_o$ is the sampling epoch, thereby to produce a number $N_s$ of versions of the sampled signal, means for processing in parallel said $N_s$ versions of the sampled signal to determine the signal timing and the signal frequency offset, and means for selecting the sample having the largest spectral peak.

8. A signal receiving station as set forth in claim 7, comprising means for determining the position of the largest spectral peak in the frequency band.

* * * * *